United States Patent [19]

Yamamoto

[11] Patent Number: 6,070,195
[45] Date of Patent: May 30, 2000

[54] IMAGE DISPLAY DEVICE AND METHOD, AND IMAGE COMMUNICATION APPARATUS AND METHOD

[75] Inventor: Kunihiro Yamamoto, Yokohama, Japan

[73] Assignee: Canon Kabushiki Kaisha, Tokyo, Japan

[21] Appl. No.: 09/015,347

[22] Filed: Jan. 29, 1998

[30] Foreign Application Priority Data

Jan. 31, 1997 [JP] Japan .................................. 9-018421

[51] Int. Cl.[7] .......................... G06F 15/16; G06F 15/173
[52] U.S. Cl. .......................... 709/247; 709/217; 709/224; 709/232
[58] Field of Search .................................. 709/217, 218, 709/219, 223, 224, 232, 234, 247; 707/500, 10; 382/232, 250; 345/329, 330, 331

[56] References Cited

U.S. PATENT DOCUMENTS

| 5,522,041 | 5/1996 | Murakami et al. | 709/223 X |
| 5,699,458 | 12/1997 | Sprague | 382/250 |
| 5,737,619 | 4/1998 | Judson | 707/500 |
| 5,764,235 | 6/1998 | Hunt et al. | 345/329 X |
| 5,778,372 | 7/1998 | Cordell et al. | 709/218 X |

*Primary Examiner*—Ahmad F. Matar
*Assistant Examiner*—Patrice Winder
*Attorney, Agent, or Firm*—Fitzpatrick, Cella, Harper & Scinto

[57] ABSTRACT

It is arranged so that a summary of schematic images is promptly displayed even if a transmission speed is low. For that purpose, a numerical value indicating a reference resolution is substituted for a variable r. The current time is substituted for a variable t0, and data having a resolution of r is decoded. The current time is substituted for a variable t1, and a time period required for decoding processing is calculated. If there is no succeeding image, the process is terminated. On the other hand, if there is a succeeding image, the time period of the decoding processing (t1–t0) is compared with a reference time period Tref. If (t1–t0) exceeds Tref, the resolution is halved. If (t1–t0) is equal to or less than Tref, (t1–t0) is compared with Tref/2. If (t1–t0) is less than Tref/2, the resolution is doubled. By thus changing or maintaining the resolution, the processing of the second step and the succeeding steps is repeated.

16 Claims, 5 Drawing Sheets

IMAGE DISPLAY DEVICE AND METHOD, AND IMAGE COMMUNICATION APPARATUS AND METHOD

BACKGROUND OF THE INVENTION

1. Field of the Invention

The present invention relates to an image display device and method, and to an image communication apparatus and method.

2. Description of the Related Art

As a result of diffusion of computer networks such as Internet, it is becoming practically possible to transmit even image data on a computer network, although some problems still exist in resolution, the transmission rate and the like.

In the general configuration of an image data base, an image file server and a client are connected to a network, and the image file server transmits assigned image data to the client in response to a request from the client. By interactively operating a computer, serving as the client, the user can display an arbitrary image stored in the image file server on a monitor of the computer.

Figure 1:
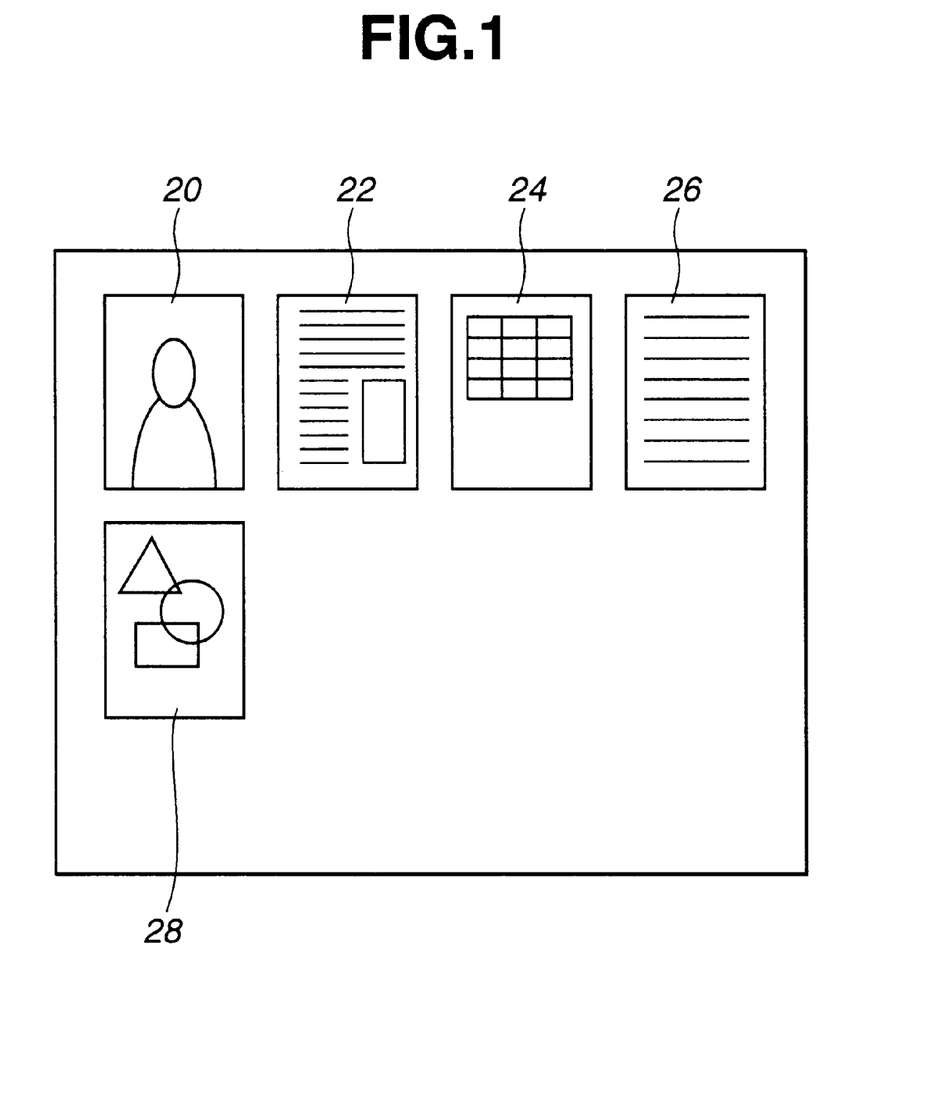
FIG. 1 is a diagram illustrating an example of display of a summary of images stored in an image file server.

For example, as shown in FIG. 1, a summary of image data stored in an image file server is displayed on a client's monitoring picture surface. In FIG. 1, reference numerals 20–28 represent schematic images for displaying an outline of the image data stored in the image file server. By selecting one of the displayed schematic images 20–28, the user selects a desired image data.

The schematic images 20–28 are subjected to hierarchical encoding, for example, according to a JBIG (Joint Bi-level Image Group) method which is an international standard encoding method. Since hierarchical encoding can decode a plurality of images having different resolutions from one image data, it is suitable for a use in which it is intended to decode a plurality of images having different resolutions. Conventionally, in order to display schematic images on a client's monitoring picture surface) hierarchically encoded image data is decoded in accordance with the resolution of the picture surface.

The band of a computer network greatly changes in accordance with a change in the state of use of other users, the configuration of the network (for example, switching from a wire LAN (local area network) to a radio LAN), or the like. Since preparation of means for securing a necessary band width is insufficient, it is generally impossible to secure the necessary band width.

When the band is narrowed as a result of a change in the band width as described above, the response time may, in some cases, extremely increase due to a decrease in the transfer rate of encoded data, so that it is necessary to wait for a long time for displaying schematic images.

SUMMARY OF THE INVENTION

It is an object of the present invention to solve the above-described problems.

It is another object of the present invention to provide an image display device and method, and an image communication apparatus and method, in which a necessary image can be retrived more promptly.

It is still another object of the present invention to realize efficient image-data processing by transmitting and displaying image data in consideration of a transmission speed of a network.

It is yet another object of the present invention to provide new functions.

According to one aspect, the present invention which achieves these objectives relates to a method for displaying at least one image stored in an image data base connected via a network. The method comprises the steps of detecting a transmission speed of the network, and displaying at least one image stored in the image data base with a resolution corresponding to the transmission speed.

According to another aspect, the present invention which achieves these objective's relates to a device for displaying at least one image stored in an image data base connected via a network. The device comprises speed detection means for detecting a transmission speed of the network, and display means for displaying at least one image stored in the image data base with a resolution corresponding to the transmission speed.

According to still another aspect, the present invention which achieves these objectives relates to a method for communicating at least one image stored in an image data base connected via a network. The method comprises the steps of detecting a transmission speed of the network, and communicating at least one image stored in the image data base with a resolution corresponding to the transmission speed.

According to yet another aspect, the present invention which achieves these objectives relates to an apparatus for communicating at least one image stored in an image data base connected via a network. The apparatus comprises speed detection means for detecting a transmission speed of the network, and communication means for communicating at least one image stored in the image data base with a resolution corresponding to the transmission speed.

The foregoing and other objects, advantages and features of the present invention will become more apparent from the following description of the preferred embodiments taken in conjunction with the accompanying drawings.

DESCRIPTION OF THE PREFERRED EMBODIMENTS

Figure 2:
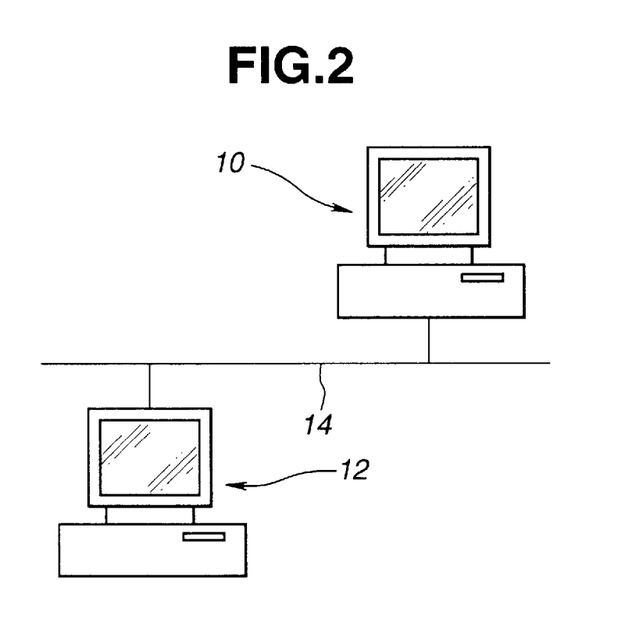
FIG. 2 is a diagram illustrating the basic configuration of an image file server and a client applied to first and second embodiments of the present invention.

Preferred embodiments of the present invention will now be described in detail with reference to the drawings.
First Embodiment FIG. 2 is a schematic block diagram illustrating the configuration of a first embodiment of the present invention. In FIG. 2, general-purpose computers 10 and 12 are connected to each other via a network 14. For example, the computer 10 is an image file server, and the computer 12 is a client. A summary of image data stored in the computer 10 is displayed on a picture surface of the computer 12 in the form of schematic images, as shown in FIG. 1. Although not shown in FIG. 2, a plurality of clients and image file servers are connected to the network 14.

Figure 3:
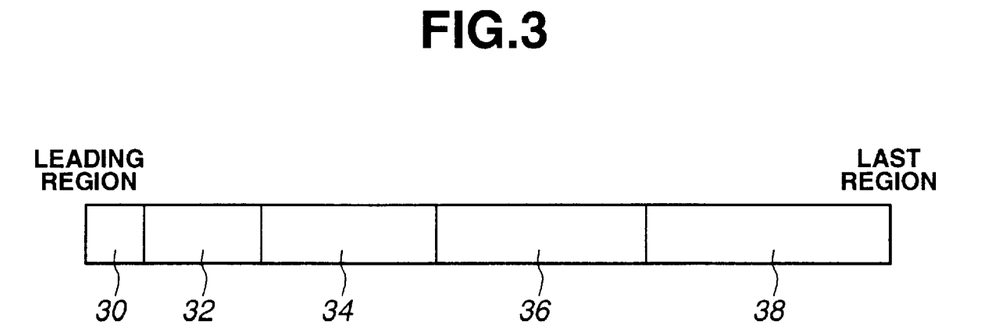
FIG. 3 is a diagram illustrating the configuration of a file for image data subjected to hierarchical encoding.

Before describing the operation of the first embodiment, hierarchical encoding will be briefly described. Image data subjected to hierarchical encoding is stored in a storage unit of the general-purpose computer 10 in a format as shown in FIG. 3. For example, when storing image data in 5 hierarchies with 200 dpi (dots per inch), encoded data corresponding to 12.5 dpi is stored in a leading region 30. Encoded data for providing an image having a resolution of 25 dpi in combination with the data in the region 30 is stored in the next region 32. Similarly, encoded data for proving images having higher resolutions are sequentially stored. Accordingly, by decoding data in the regions 30 and 32, an image having a resolution of 25 dpi is obtained, and by decoding data in regions 30, 32 and 34, an image having a resolution of 50 dpi is obtained. By decoding data in all regions 30–38, an image having a resolution of 200 dpi is obtained.

For example, suppose that schematic images on the picture surface of the computer 12 have a resolution of 50 dpi. In this case, the computer 12 cannot proceed to the next processing until schematic images of 50 dpi are displayed by receiving all encoded data stored in the regions 30, 32 and 34. If the effective transmission speed of the network 14 when transmitting encoded data is low, there is the possibility that a long time is required even for transmitting such low-resolution image data.

In order to solve such a problem, in the first embodiment, the computer 12 measures a time period required for completely receiving necessary data. If the measured time period exceeds a specified time period, the resolution of schematic images to be displayed is reduced. It is thereby possible to greatly reduce a time period required for completely receiving the necessary data.

Figure 4:
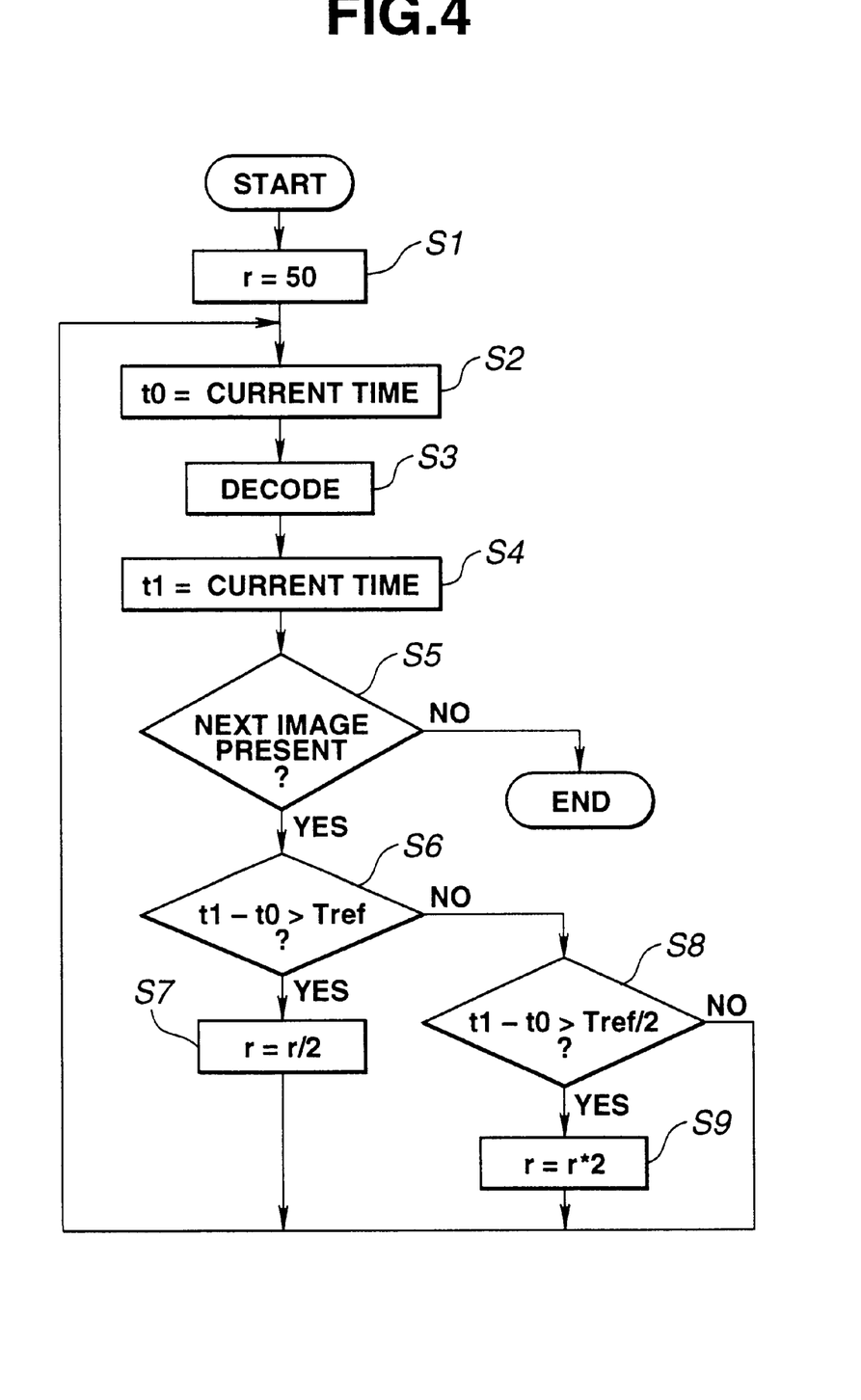
FIG. 4 is a flowchart illustrating the operation of the first embodiment.

FIG. 4 is a flowchart illustrating the operation of the computer 12. A program for executing the processing of the flowchart is stored in a RAM (random access memory, not shown) within the computer 12 or in a recording medium mounted from the outside of the computer 12. The processing of the flowchart is executed by a CPU (central processing unit) within the computer 12. A numerical value indicating a reference resolution (50 dpi in this case) is substituted for a variable r (step S1). The current time is substituted for a variable t0 (step S2), and data having a resolution of r is decoded (step S3). The current time is substituted for a variable t1, and a time period (t1–t0) required for decoding processing is calculated (step S4).

If there is an image to be displayed as a schematic image and there is no succeeding image (i.e., if the result of determination in step S5 is negative), the process is terminated. On the other hand, is there is a succeeding image (i.e., if the result of determination in step S5 is affirmative) as in the case shown in FIG. 1, the time period of the decoding processing (t1–t0) is compared with a reference time period Tref (step S6). If (t1–t0) exceeds Tref in step S6, the resolution is halved (step S7). If (t1–t0) is equal to or less than Tref in step S6, (t1–t0) is compared with Tref/2 (step S8). If (t1–t0) is less than Tref/2, the resolution is doubled (step S9). By thus changing or maintaining the resolution, the processing of step S2 and the succeeding steps is repeated.

Since it is, of course, impossible to reduce the resolution to a value lower than the lowest resolution (12.5 dpi in this case), there will be a case where the resolution cannot be halved in step S7. Similarly, since resolution cannot be increased to a value higher than the highest resolution (200 dpi in this case), there will be a case where the resolution cannot be doubled in step S9.

As described above, in the first embodiment, since the resolution of a displayed image is dynamically changed based on the processing time period for the immediately preceding image, the image can be completely displayed within a short time period irrespective of a variation in the transmission capacity of a network.

It is apparent that the resolution of the displayed image may be changed based on the processing time period for a plurality of immediately preceding images, instead of being changed based on the processing time period for the immediately preceding image.

Alternatively, the user may select whether the resolution of the displayed image is to be changed based on the processing time period for the immediately preceding image, or the resolution of the displayed image is to be changed when a plurality of immediately preceding images consecutively require a processing time period equal to or more than (or equal to or less than) a reference processing time period, using a keyboard or a mouse of the computer 12. According to this approach, it is possible to prevent the occurrence of a change in the resolution due to a temporary change in the transmission capacity of the network.

Figure 6:
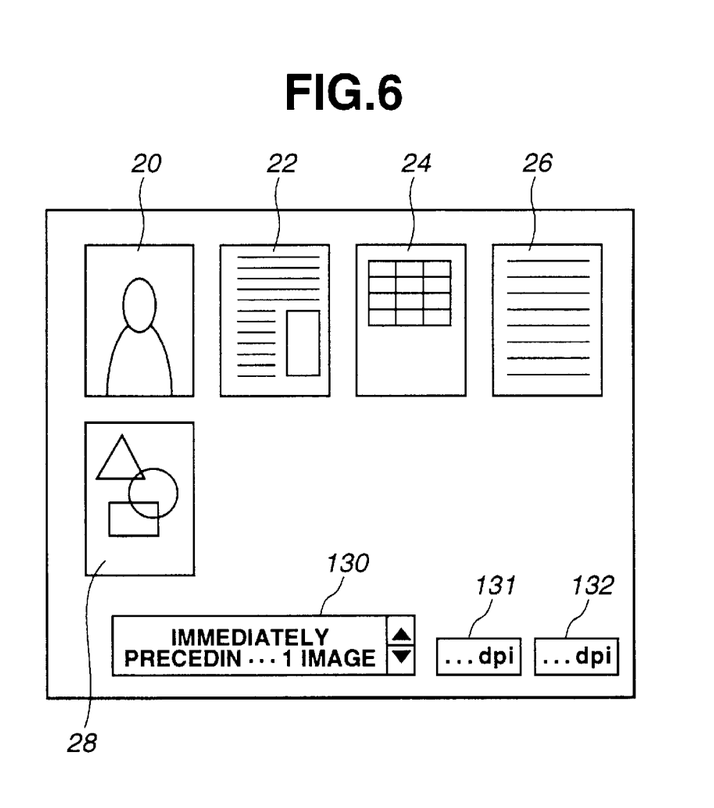
FIG. 6 is an example of display in the first embodiment.

FIG. 6 illustrates an example of display in the computer 12 in such an approach. In the case shown in FIG. 6, the above-described setting can be entered in a window 130 using the keyboard or the mouse. In addition, the operator can input and set both of the above-described highest resolution and lowest resolution in windows 131 and 132.

According to this configuration, the minimum resolution desired by the operator can be assured. Furthermore, it is possible to prevent display with a high resolution which has little visual merit based on the operator's experience, although it depends on the display capability of the computer 12.

In FIG. 4, the display resolution of an image is changed in accordance with the time period for decoding. However, the display resolution of an image being decoded or the next image may be changed in accordance with the receiving speed of data.

In this case, the computer 10 transmits the image 20 shown in FIG. 1 with a resolution of 50 dpi in response to a request of schematic images from the computer 12. The computer 12 transmits the time period for receiving the image 20 to the computer 10. The computer 10 checks the degree of jam (the data receiving speed) of the network based on the time period required for transmitting the image 20 and the above-described time period for receiving the image 20.

If the degree of jam is equal to or more than a reference value, the computer 10 transmits the next image 22 by changing the resolution to 25 dpi. On the other hand, if the degree of jam is less than the reference value, the computer 10 transmits the next image 22 with a resolution of 75 dpi.

In another approach, information relating to the transmission time period is added to the header of the image 20 when the computer 10 transmits the image 20. When receiving the image 20, the computer 12 compares the information relating to the transmission time period with the time period for receiving the image 20. In this case, when the data receiving speed is low, the computer 12 transmits a command to reduce the resolution to the computer 10. On the other hand, when the data receiving speed is high, the computer 12 transmits a command to increase the resolution to the computer 10. According to this configuration, the load of the computer 10 at the transmission side which communicates with a plurality of clients can be reduced.

Figure 5:
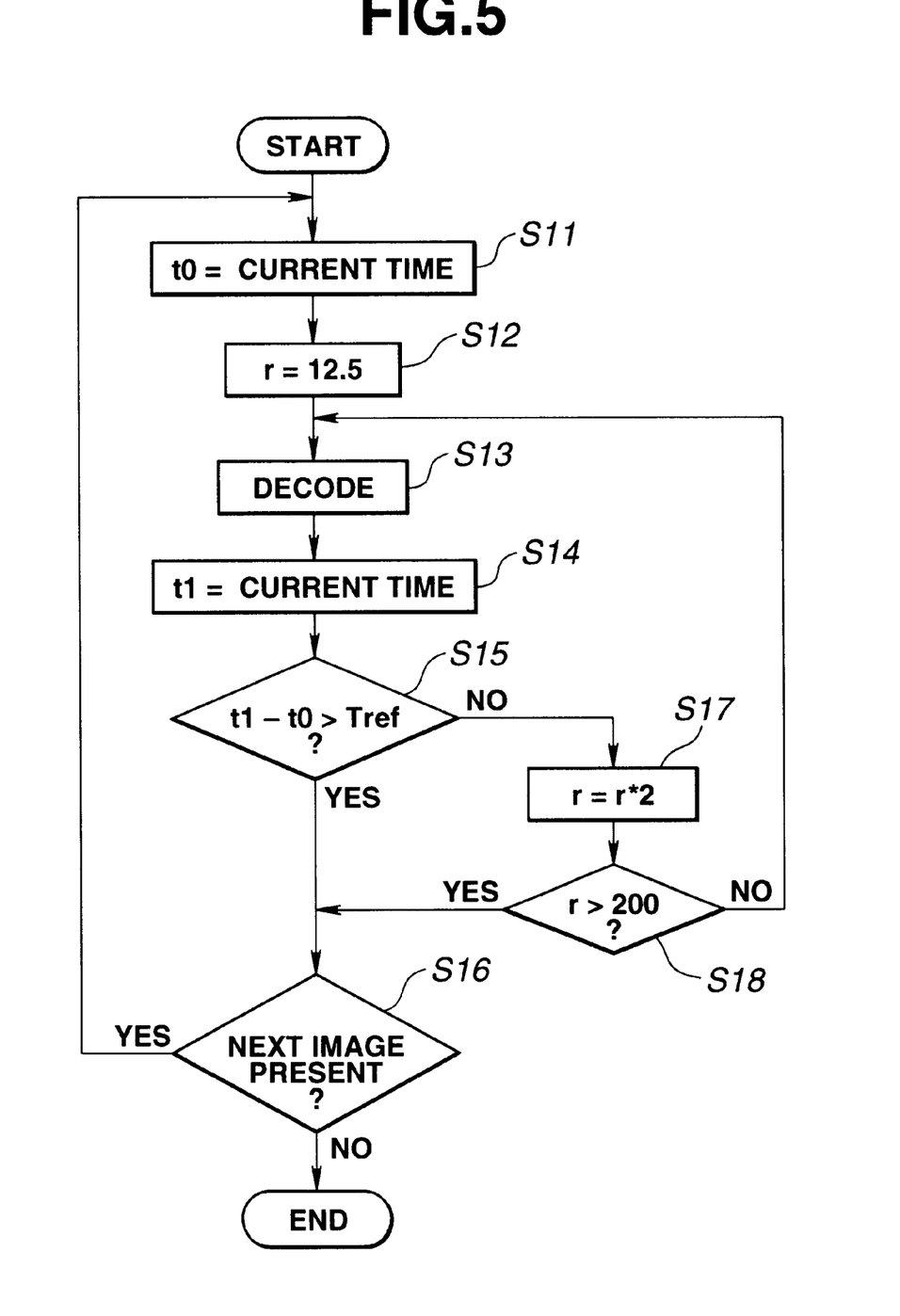
FIG. 5 is a flowchart illustrating the operation of the second embodiment.

In the computer 12, the time period for decoding an image being decoded may be monitored, and if it seems that much time is required for decoding, the decoding may be interrupted and an image having a low resolution may be displayed. FIG. 5 illustrates a flowchart of such an operation.

First, the current time is substituted for a variable t0 (step S11), and a numerical value indicating the lowest resolution (12.5 dpi in this case) is substituted for a variable r (step S12). Then, encoded data having a resolution r is decoded (step S13). The current time is substituted for a variable t1, and a time period (t1−t0) required for decoding the encoded data having the resolution r is calculated (step S14).

The decoding processing time period (t1−t0) is compared with a reference time period Tref (step S15). If (t1−t0) is equal to or less than Tref as a result of determination in step S15, the resolution is halved (step S17). If the resolution exceeds 200 dpi as a result of determination in step S18, the process proceeds to processing of the next image (step S16). If the resolution is equal to or less than 200 dpi as a result of determination in step S18, the process returns to step S13, where encoded data having the resolution r is decoded. Thus, while the encoding processing time period (t1−t0) does not exceed the reference time period Tref, encoded data having a higher resolution is decoded.

If the next image is present as a result of determination in step S16, the processing starting from step S11 is repeated. If the next image is absent as a result of determination in step S16, the process is terminated.

As can be easily understood from the foregoing description, since the display resolution of an image is dynamically changed in accordance with the transmission speed of the network, it is possible to obtain an excellent response in various situations. That is, when the transmission speed of the network is low, the amount of data to be transmitted is reduced by reducing the display resolution for schematic images, thereby preventing an increase in the time period for displaying the images.

Second Embodiment

In the first embodiment, a description has been provided illustrating data subjected to hierarchical encoding. However, the same effects as in the first embodiment may also be obtained for other types of data. For example, in a flash-pix image format, image data at respective hierarchies are independently encoded so as not to be correlated with one another. That is, in the flash-pix image format, image data with 12.5 dpi, image data with 25 dpi, image data with 50 dpi, . . . , image data with 200 dpi are separately stored in the computer 10. (The amount of data stored in the computer 10 is data with 12.5 dpi+data with 25 dpi+data with 50 dpi+. . . + date with 200 dpi, as shown in FIG. 7.)

Figure 7:
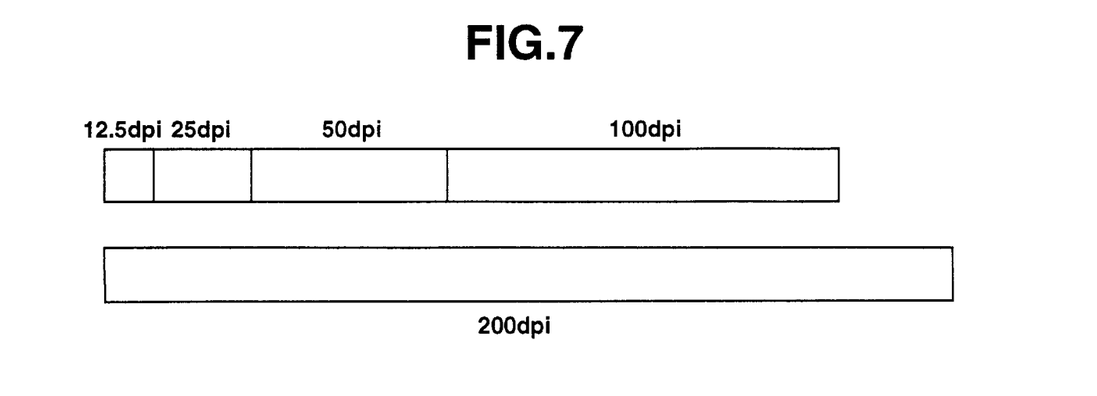
FIG. 7 is a flowchart illustrating a state of storage of images in the second embodiment.

In the flash-pix image format, for example, when only data with 25 dpi is required, the data with 25 dpi shown in FIG. 7 is transmitted. (The data with 12.5 dpi is not transmitted.)

Accordingly, before starting data transmission, the computer 10 must determine the resolution of data to be transmitted. In this case, also, a transmission band can be efficiently utilized by determining the resolution according to the algorithm used in the first embodiment.

In each of the first and second embodiments, by assigning a desired image from among displayed schematic images using the keyboard or the mouse of the computer 12, the assigned image is transmitted to the computer 10. The image used in the transmission is an image having a larger display area and a higher resolution than the displayed schematic image.

In the second embodiment, image data is stored in the computer 10 in the flash-pix image format. In the flash-pix image format, image data comprises a plurality of tiles, and each tile can be accessed. Accordingly, when assigning a desired image from among schematic images, by assigning an area in the desired image, the computer 10 can also transmit only the tile corresponding to the assigned area of the assigned image to the computer 12.

Other Embodiments

The present invention may be applied to a system comprising a plurality of apparatuses (such as a host computer, an interface apparatus, a reader, a printer and the like), or to an apparatus comprising a single unit (such as a copier, a facsimile apparatus or the like.

The objects of the present invention may, of course, be also achieved by supplying a system or an apparatus with a storage medium storing program codes of software for realizing the functions of the above-described embodiments, and reading and executing the program codes stored in the storage medium by a computer (or a CPU or an MPU (microprocessor unit)) of the system or the apparatus.

In such a case, the program codes themselves read from the storage medium realize the functions of the above-described embodiments, so that the storage medium storing the program codes constitutes the present invention.

For example, a floppy disk, a hard disk, an optical disk, a magnetooptical disk, a CD-ROM (compact disk-read-only memory), a CD-R (recordable), a magnetic tape, a non-volatile memory card, a ROM or the like may be used as the storage medium for supplying the program codes.

The present invention may, of course, be applied not only to a case in which the functions of the above-described embodiments are realized by executing program codes read by a computer, but also to a case in which an OS (operating system) or the like operating in a computer executes a part or the entirety of actual processing, and the functions of the above-described embodiments are realized by the processing.

The present invention may, of course, be applied to a case in which, after writing program codes read from a storage medium into a memory provided in a function expanding card inserted into a computer or in a function expanding unit connected to the computer, a CPU or the like provided in the function expanding card or the Junction expanding unit performs a part or the entirety of actual processing, and the functions of the above-described embodiments are realized by the processing.

The individual components shown in outline in the drawings are all well-known in the image display device and method arts and in the image communication apparatus and method arts and their specific construction and operation are not critical to the operation or the best mode for carrying out the invention.

While the present invention has be(en described with respect to what are presently considered to be the preferred embodiments, it is to be understood that the invention is not limited to the disclosed embodiments. To the contrary, the present invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A method for displaying at least one image stored in an image data base connected to a network, said method comprising the steps of:

detecting a transmission speed of the network corresponding to a transmission speed of at least one image stored in the image data base and transmitted on the network just before transmitting on the network a next image stored in the image data base; and displaying the next image stored in the image data base with a resolution corresponding to the detected transmission speed.

2. A method according to claim 1, wherein images stored in the image data base are compressed according to a hierarchical encoding method.

3. A method according to claim 2, wherein said detecting step detects a decoding time period required for decoding an image stored in the image data base.

4. A method according to claim 3, wherein, when the decoding time period exceeds a predetermined value, said displaying step displays an image having a resolution for which decoding has been completed and proceeds to processing of a next image.

5. A method according to claim 3, wherein, when the decoding time period exceeds a first predetermined value, said displaying step displays an image with a lower resolution, and, when the decoding time period is less than a second predetermined value smaller than the first predetermined value, said displaying step displays an image with a higher resolution.

6. A method according to claim 1, wherein the resolution corresponding to the detected transmission speed is less than a maximum resolution instructed by a user.

7. A method according to claim 1, wherein the resolution corresponding to the detected transmission speed is greater than a minimum resolution instructed by a user.

8. A method according to claim 1, wherein the at least one image transmitted just before transmitting the next image on the network comprises a plurality of images including an image transmitted just before transmitting the next image on the network.

9. A device for displaying at least one image stored in an image data base connected to a network, said device comprising:

speed detection means for detecting a transmission speed of the network corresponding to a transmission speed of at least one image stored in the image data base and transmitted on the network lust before transmitting on the network a next image stored in the image data base; and display means for displaying the next image stored in the image data base with a resolution corresponding to the detected transmission speed.

10. A device according to claim 9, wherein images stored in the image data base are compressed according to a hierarchical encoding method.

11. A device according to claim 10, wherein said speed detection means comprises decoding-time-period detection means for detecting a decoding time period required for decoding an image stored in the image data base.

12. A device according to claim 11, wherein, when the decoding time period exceeds a predetermined value, said display means displays an image having a resolution for which decoding has been completed and proceeds to processing of a next image.

13. A device according to claim 11, wherein, when the decoding time period exceeds a first predetermined value, said display means displays an image with a lower resolution, and, when the decoding time period is less than a second predetermined value smaller than the first predetermined value, said display means displays an image with a higher resolution.

14. A method for communicating at least one image stored in an image data base connected to a network, said method comprising the steps of:

detecting a transmission speed of the network corresponding to a transmission speed of at least one image stored in the image data base and transmitted on the network just before transmitting on the network a next image stored in the image data base; and communicating the next image stored in the image data base with a resolution corresponding to the detected transmission speed.

15. An apparatus for communicating at least one image stored in an image data base connected to a network, said apparatus comprising:

speed detection means for detecting a transmission speed of the network corresponding to a transmission speed of at least one image stored in the image data base and transmitted on the network lust before transmitting on the network a next image stored in the image data base; and communication means for communicating the next image stored in the image data base with a resolution corresponding to the detected transmission speed.

16. A computer recording medium storing a program for implementing a method for communicating at least one image stored in an image data base connected to a network, said method comprising the steps of:

detecting a transmission speed of the network corresponding to a transmission speed of at least one image stored in the image data base and transmitted on the network just before transmitting on the network a next image stored in the image data base; and communicating the next image stored in the image data base with a resolution corresponding to the detected transmission speed.

* * * * *

UNITED STATES PATENT AND TRADEMARK OFFICE
CERTIFICATE OF CORRECTION

PATENT NO. : 6,070,195
DATED : May 30, 2000
INVENTOR(S) : Kunihiro Yamamoto

It is certified that error appears in the above-identified patent and that said Letters Patent is hereby corrected as shown below:

[56] References Cited,
U.S. Patent Documents
Insert: -- 5,555,377   9/1996   Christensen et al. --.
Insert: -- 5,761,438   6/1998   Sasaki --.
Insert: -- 5,968,132   10/1999  Tokunaga et al. --.

Column 1,
Line 38, "surface)" should read -- surface, --.
Line 60, "retrived" should read -- retrieved --.

Column 2,
Line 9, "objective's" should read -- objectives --.

Column 3,
Line 54, "is" (first occurrence) should read -- if --.

Column 6,
Line 44, "Junction" should read -- function --.
Line 54, "be(en" should read -- been --.

Column 7,
Line 44, "lust" should read -- just --.

UNITED STATES PATENT AND TRADEMARK OFFICE
CERTIFICATE OF CORRECTION

PATENT NO. : 6,070,195
DATED : May 30, 2000
INVENTOR(S) : Kunihiro Yamamoto

It is certified that error appears in the above-identified patent and that said Letters Patent is hereby corrected as shown below:

<u>Column 8,</u>
Line 33, "lust" should read -- just --.

Signed and Sealed this

Twenty-fifth Day of September, 2001

Attest:

*Attesting Officer*

NICHOLAS P. GODICI
*Acting Director of the United States Patent and Trademark Office*